Jan. 4, 1944.  E. J. EDMUNDS  2,338,084
INTERNAL COMBUSTION ENGINE
Filed July 1, 1942  4 Sheets-Sheet 1
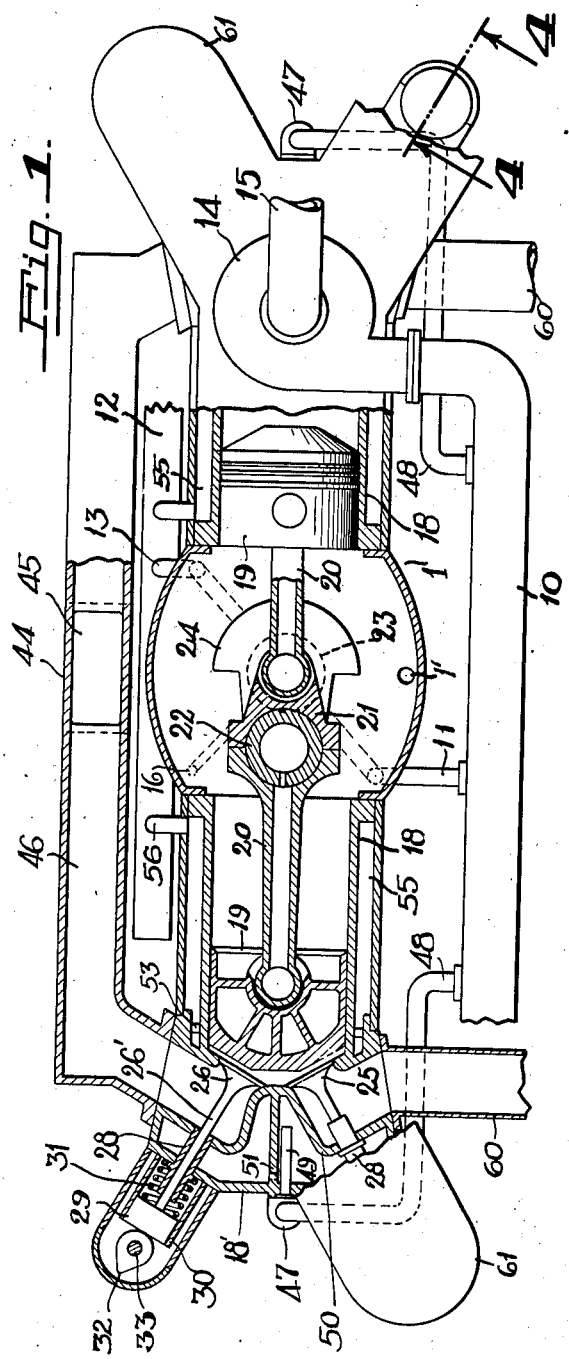
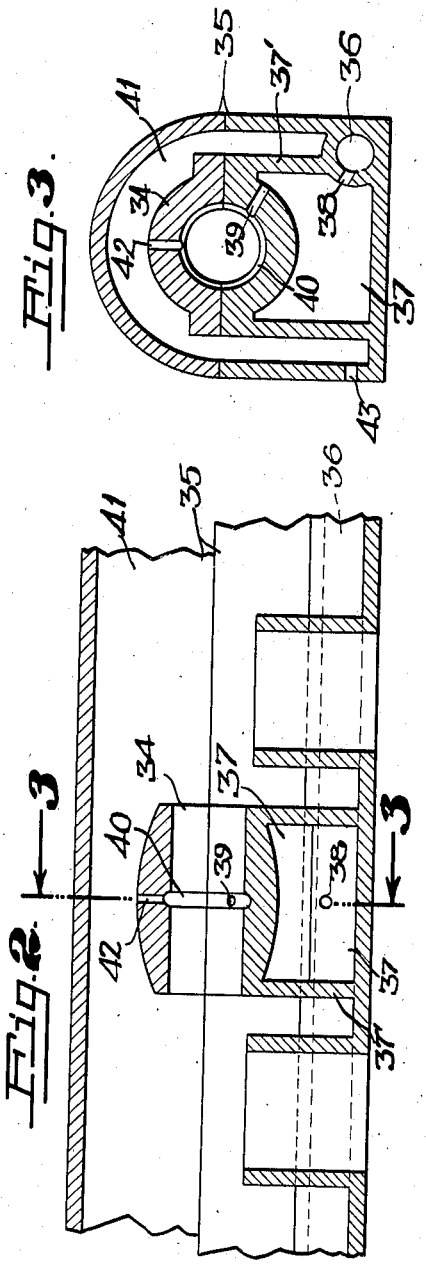
INVENTOR,
Earl J. Edmunds
BY
J. E. Trabucco
ATTORNEY.

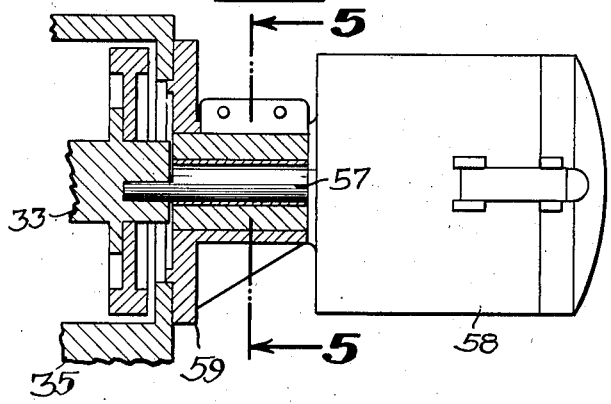
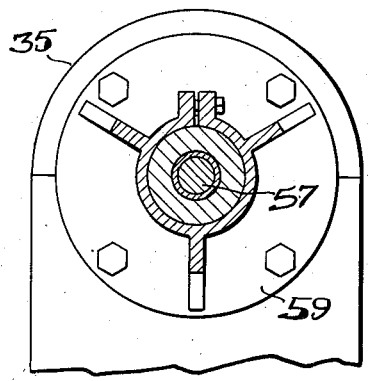
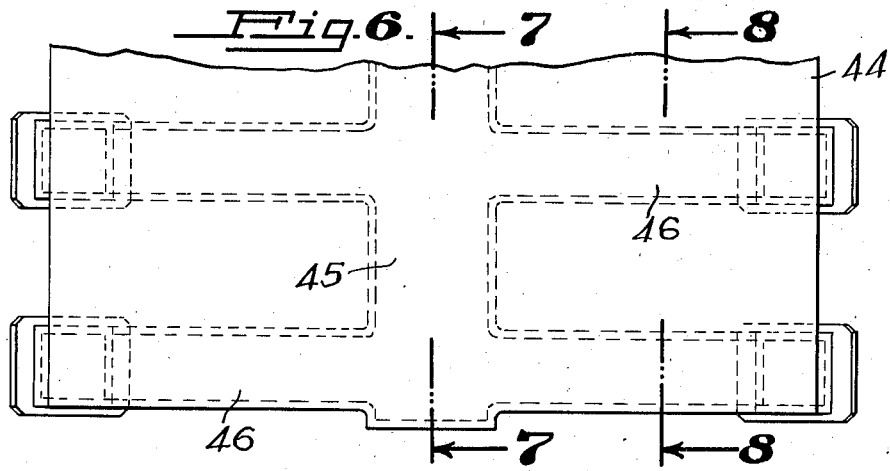
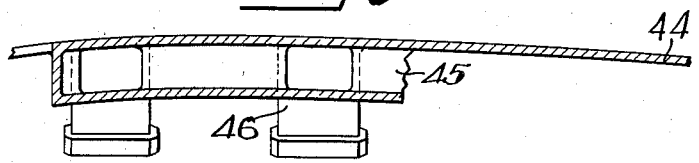

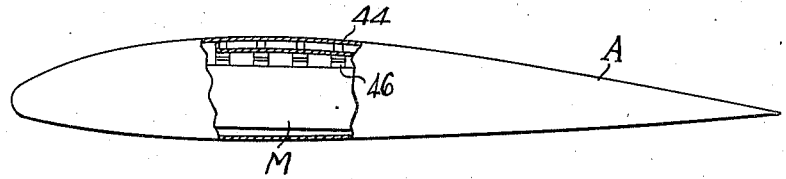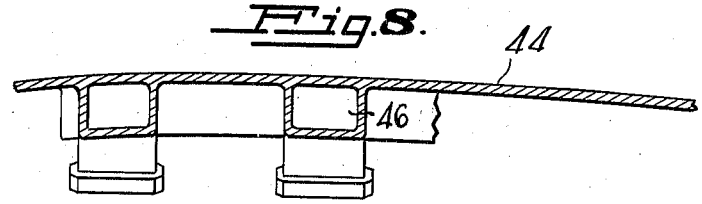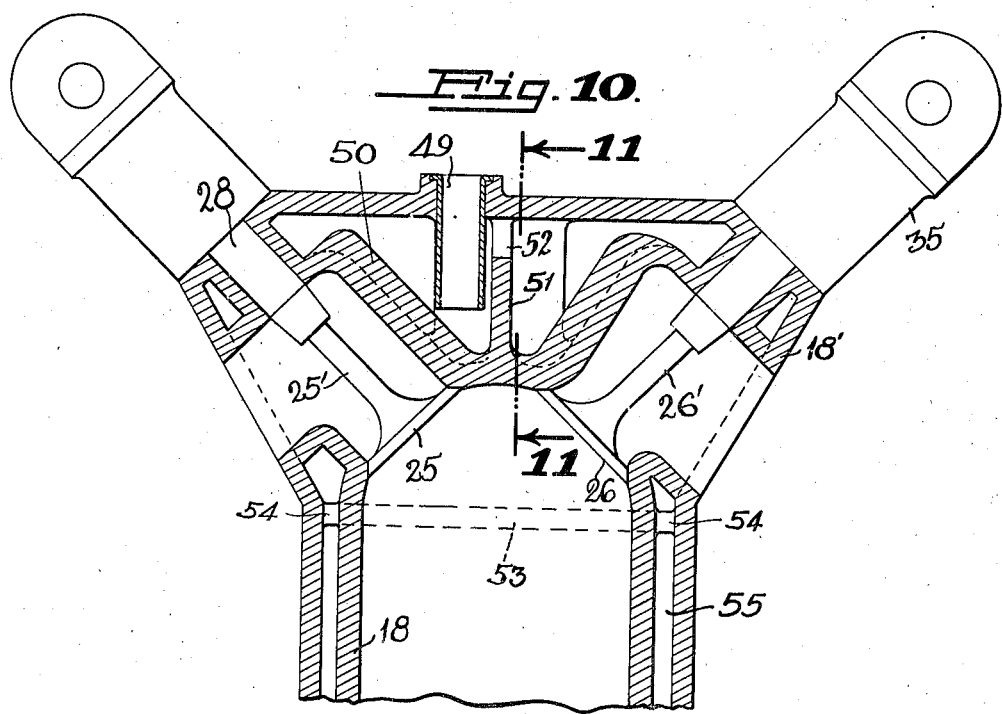

Jan. 4, 1944.　　　　E. J. EDMUNDS　　　　2,338,084
INTERNAL COMBUSTION ENGINE
Filed July 1, 1942　　　　4 Sheets-Sheet 4
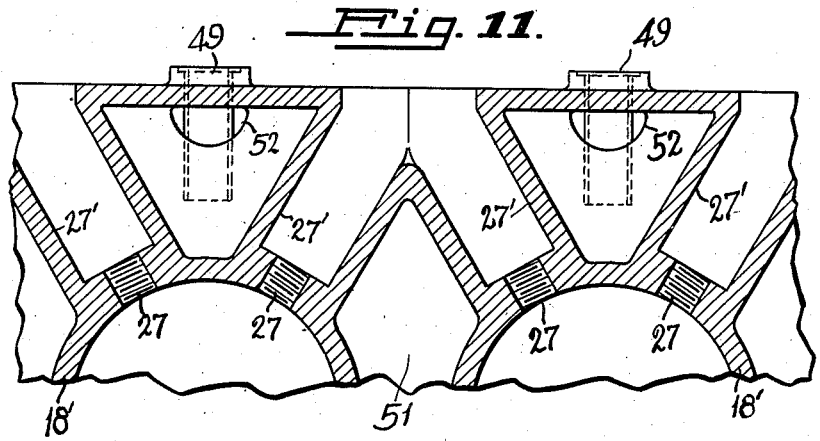
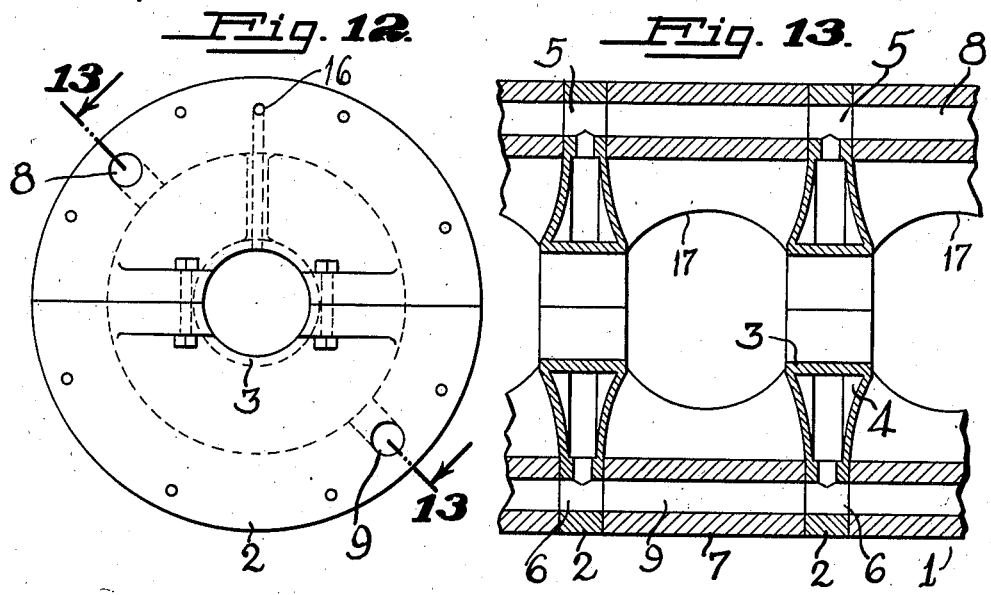

Patented Jan. 4, 1944

2,338,084

UNITED STATES PATENT OFFICE 2,338,084

INTERNAL COMBUSTION ENGINE

Earl J. Edmunds, Los Angeles, Calif., assignor to Montgomery Brothers, a copartnership consisting of Fred H. Montgomery and W. Ray Montgomery, both of San Francisco, Calif.

Application July 1, 1942, Serial No. 449,333

12 Claims. (Cl. 123—173)

This invention relates to improvements in internal combustion engines of the type particularly adapted for use with aircraft.

The primary object of my invention is to provide an improved airplane engine having its cylinders arranged in opposed banks of prefererably six each, thereby enabling the shape of the engine to be such that the latter can be mounted entirely within the wing structure of most airplanes.

Another object of my invention is to provide an engine of the kind characterized having its fuel intake manifold so arranged and shaped that its upper exposed surface conforms to and is aligned with the upper surface of the airplane wing within which the engine is mounted, thereby providing an improved streamlined cooling means by which excess heat carried by the gaseous fuel may be readily dissipated into the outer atmosphere before its delivery to the combustion chambers.

A further object of my invention is to provide an improved engine of the type characterized, wherein the cylinders being arranged in two opposed banks positioned at angles of one hundred and eighty degrees apart, enable the opposing forces resulting from timed explosions to be so distributed that the bearing loads are reduced to a minimum, thereby causing the crank shaft to substantially float within its bearings and thus by eliminating undue friction, cause the engine's efficiency and performance to be considerably improved.

A still further object of my invention is to provide an engine of the type characterized having a construction by which it is possible to greatly increase the horsepower and at the same time reduce the weight, this desirable result being accomplished primarily by reason of a novel arrangement of elements so associated as to produce improved results in efficiency and operation.

Several other objects provided by the present invention are: That an engine is provided, which, by reason of its novel shape and construction can be mounted in an aircraft wing in a position where it will offer no increased wind resistance; that an engine is provided, which, when mounted in an aircraft wing, will afford a power unit that does not occupy space capable of being advantageously used for armament and firing mechanisms; that an engine is provided which by reason of its decreased weight and increased horsepower enables a plane upon which it is mounted to carry increased loads of both fuel and bombs; and that an engine is provided which is less expensive to manufacture than airplane engines of the type now commonly used, while at the same time its performance is more satisfactory and dependable.

Further advantages and features of my improved aircraft engine, and the form, construction and arrangement of parts will be hereinafter fully set forth, illustrated on the accompanying drawings, and incorporated in the appended claims.

In the accompanying drawings:

Fig. 1 is a front view, partly in section, of an aircraft engine embodying the preferred principles of my invention;

Fig. 2 is an enlarged detail in section of the cam shaft bearings and housing;

Fig. 3 is a section taken on the line 3—3 of Fig. 2;

Fig. 4 is a sectional view taken on the line 4—4 of Fig. 1;

Fig. 5 is a sectional view taken on the line 5—5 of Fig. 4;

Fig. 6 is a top plan of a fragmentary part of the fuel intake manifold, which in normal practice forms a surface complementary to the upper surface of the airplane wing within which the engine is mounted;

Fig. 7 is a section taken on the line 7—7 of Fig. 6;

Fig. 8 is a section taken on the line 8—8 of Fig. 6;

Fig. 9 is a diagrammatic view, partly in section, showing the engine mounted in an airplane wing with the upper side of the fuel intake manifold aligned with the upper surface of the said wing;

Fig. 10 is an enlarged detailed sectional view of the upper part of one of the cylinders, showing the structure employed for introducing and circulating the liquid cooling medium into and through the circulatory system associated with the cylinder;

Fig. 11 is a sectional view taken on the line 11—11 of Fig. 10;

Fig. 12 is a bearing web forming a part of the crankcase assembly;

Fig. 13 is a sectional view taken through the crankcase assembly as indicated by the section lines 13—13 of Fig. 12;

Referring to the drawings, and particularly to Figs. 1, 12 and 13, the numeral 1 designates a suitably shaped crankcase comprising a plurality of replaceable parts which are bolted or otherwise suitably secured together. Forming parts of the crankcase assembly are a plurality of spaced bearing-webs 2 which are preferably made in two parts that are bolted together as shown in Fig. 12. Each of the bearing webs 2 is formed with axial bearings 3 within which the crankshaft is journaled. The bearing-webs 2 are each provided with hollow chambers 4 extending amount its axial bearing 3, and communicating with the said chamber are two openings or channels 5 and 6 which extend transversely through the said web near its periphery, the said openings constituting an inlet and an outlet, respectively, for a liquid cooling medium. Interposed between and suitably secured to the bearing-webs 2 are crankcase sections 7, each having inlet and outlet channels 8 and 9 in its walls which register, respectively, with the openings 5 and 6 of the bearing-webs. The connected inlet channels 8 and the holes 5 of the various crankcase sections and the bearing-webs provide a connected passageway for supplying a liquid cooling medium to the chambers 4 for the purpose of cooling the bearings 3. The connected outlet holes 6 and outlet channels 9 of the bearing-webs and the crankcase sections provide a connected passageway for returning the cooling medium to a cooling radiator. Connecting the inlet channel 8 of one of the sections 7 with a supply manifold 10 is a conduit 11, and connecting the outlet channel 9 of one of the sections with a return manifold 12 is a conduit 13. The supply manifold 10 is connected to the discharge side of a suitable pump 14 which in turn is connected at its intake side by a conduit 15 to a suitable cooling radiator (not shown). The return manifold 12 is also suitably connected to the radiator. As shown in Fig. 12, the bearings 3 are supplied from a feed line 16 with a lubricant in the usual manner.

A crankcase made in accordance with my invention is adapted for use with either radial or in-line type motors. The fact that the crankcase is made in sections permits the convenient replacement of damaged parts whenever required.

The crankcase sections 7 are each provided with a pair of opposed openings 17 which register with cylinders 18 secured in the usual manner to the crankcase sections. The cylinders are arranged in two opposed banks with a certain cylinder of one bank positioned directly opposite a particular cylinder of the other bank.

In each of the cylinders 18 is a piston 19 which, through a hollow connecting rod 20 and suitable bearing means 21 is connected to a throw 22 of a crankshaft 23. Counterbalancing weights 24 are secured to the crankshaft at points opposite each of the bearing means 21. The crankshaft throws 22 are disposed in predetermined angular positions with respect to one another, and to each throw is connected a pair of opposed pistons.

In the preferred embodiment of my invention there would be provided twelve cylinders arranged in two opposed banks or aligned rows of six each, with a cylinder of one bank paired with and positioned opposite a particular cylinder of another bank, and with the pistons of each pair of cylinders suitably connected to one of the throws of the crankshaft. An engine embodying the principles of my invention may also comprise other combinations or sets of cylinders, etc., it being understood that the foregoing example is selected because it is so designed and balanced as to give improved rhythmic performance and operate in a particularly smooth and satisfactory manner.

Each cylinder has a head 18' which is provided with an exhaust valve 25 having a valve stem 25', a fuel intake valve 26, having a valve stem 26', and openings 27 (see Fig. 11) for the positioning of suitable spark plugs (not shown).

Each valve stem slidably extends through a sleeve bushing 28 and its upper end engages with a tappet member 29 which is movably supported in a cylindrical guide 30. The valve is opened against the action of a spring 31 at predetermined intervals by means of a cam 32 formed on a cam shaft 33.

As shown in Figs. 2 and 3, the supporting structure for the cam shaft 33 comprises a number of bearings 34 formed within a two-piece housing 35 which is suitably secured to the heads 18' of the cylinders 18. The cam shaft housing 35 is preferably formed at suitably spaced intervals with upwardly protruding tubular members which form the cylindrical guides 30.

The lubricant for each of the bearings 34 includes an oil supply line 36 which is built in and extends longitudinally through the lower side of the housing 35. From the line 36 the oil enters a closed inner chamber 37 located beneath the bearing 34 through an inlet port 38, and due to the particular position of the said port, it is given a whirling motion inside the said chamber. From the chamber 37 the oil passes to the inner surface of the bearing 34 through an inlet 39 which is preferably positioned substantially above the inlet port 38. The inner end of the inlet 39 communicates with a suitably proportioned annular groove 40 located at the inner surface of the bearing 34. From the annular groove 40 the oil passes into an outer chamber 41 through an outlet 42 located in the upper side wall of the bearing 34. From the outer chamber 41 the oil passes through an outlet 43 in the lower side of the housing 35 and into a line leading to a suitable storage tank or oil cooler.

The oil is delivered to the supply line 36 by a suitable scavenger pump (not shown), and its temperature varying in accordance with the increased or decreased load of the engine, is normally quite hot when delivered to the said supply line. The hot oil as it swirls inside the inner chamber 37 causes an even expansion of the walls 37' surrounding the said chamber. The lower side of the bearing 34 being formed at the outer ends of the walls 37', is carried upwardly as the said walls expand, thereby causing the cam shaft 33 and the cams 32 to be moved in the same direction. Thus as the load of the motor is increased and the valve stems 25' and 26' expand with the increase in temperature, the cams 32 will be automatically moved in a direction away from the tappet members 29, thereby compensating for the increased expansion of said valve stems. By providing a lubricating system for the cam shaft bearings which utilizes the hot oil drawn from the crankcase through the outlet opening 1', suitable means is provided for automatically compensating for the increased or decreased expansion of the valve stems, thereby insuring a suitable seating of the valves under substantially all operating conditions.

The fuel intake manifold extends longitudinally above the banks of cylinders and its upper side 44 is shaped to conform to the contour and curvature of the upper surface of the particular airplane wing A within which the motor, conventionally shown at M, is mounted (see Fig. 9). The airplane wing is ordinarily provided at its upper surface with a rectangular or other suitably shaped opening beneath which the motor is located. The upper side 44 of the fuel intake manifold is designed and shaped to close this opening, and its position is such that it forms a part of the upper wing surface when the engine is properly installed in the wing structure. The upper side 44 of the fuel intake manifold being in direct contact with the outer atmosphere, provides an improved cooling means for reducing the temperature of the fuel as it is being delivered from a supercharger to the combustion chambers. The heat generated by the engine usually increases in proportion to the increased speed of the airplane, but with the surface 44 of the intake manifold passing through and encountering the outer atmosphere at an increased speed, the heat from the fuel is dissipated at an increased rate. Thus, improved cooling means is provided for automatically maintaining the incoming fuel at a substantially uniform low temperature, irrespective of the increased or decreased load of the engine.

The fuel intake manifold is provided beneath its upper side 44 with a main channel 45 having oppositely disposed extensions, conduits or branches 46 leading to the combustion chambers of the cylinders.

The principles of my improved cooling means may be employed in reducing the temperatures of other fluids used in an engine, such as lubricants and liquid coolants.

Secured to the heads 18' of the cylinders 18 is a longitudinally disposed conduit 47 (see Fig. 1), which is connected as at 48 to the supply manifold 10. The water jacket of each of the cylinder heads is supplied with the liquid cooling medium from the conduit 47 by a jet inlet pipe 49. The discharge end of each jet is positioned to deliver the cooling medium directly upon the hottest area of the engine, namely, upon that part of the cylinder head which is just above the exhaust port. The cooling medium upon striking against the aforesaid point on the cylinder head flows around the finned wall 50 surrounding the channel leading from the exhaust port (see Fig. 10). The cylinder heads 18' are each provided with a substantially vertical partition 51 which divides the interior of the said head into two main chambers, one extending above and around the exhaust port, and the other extending above and around the intake port. In the upper side of the partition 51 there is provided an outlet opening 52, which, when the cooling medium substantially fills the particular chamber into which it is first admitted, conveys the said medium into the other chamber surrounding the intake port.

A baffle 53 encircling each cylinder near its upper end is provided with discharge openings 54 which allow the cooling medium to flow downwardly from the two chambers of the cylinder head and form a water jacket 55 extending around the cylinder wall. The size or capacity of the openings 54 are such that there will not be too rapid a flow of the cooling medium from the chambers in the cylinder head to exhaust them before the function of cooling the said heads has been completed. The partition 51 confines the liquid cooling medium to the chamber located immediately above the exhaust port for an appreciable time and until it has taken up a substantial amount of the excess heat accumulation in the particular area of the cylinder head through which the gases of combustion are discharged. The cooling medium, after circulating throughout the cylinder head, flows downwardly through the discharge openings 54 in the baffle 53 and into the water jacket 55, from whence it proceeds through a conduit 56 to the return manifold 12. The particular discharge opening 54 connecting the chamber located above the exhaust port with the water jacket of the cylinder being of substantially less capacity than the jet 49, causes the liquid coolant to substantially fill this chamber before flowing through outlet 52 into the chamber located above the intake port. It will be noted that the cooling medium is first admitted and temporarily confined in the particular area of the cylinder head around the exhaust port which is hottest; that it then proceeds to the cooler area around the intake port; and that it subsequently flows downwardly around the comparatively cool cylinder wall, from whence it is withdrawn. My improved cooling system, functioning in the manner described, effectively maintains the cylinders and their heads at uniformly moderate temperatures throughout, thereby greatly increasing the operating efficiency of the engine.

As shown in Fig. 11, the upper dome-shaped end of the cylinder 18 is braced and considerably strengthened by inclined cylindrical walls 27' which provide chambers within which the spark plugs are positioned. The cylinder head 18' being internally reenforced by means of the partition 51, and the inclined cylindrical walls 27', embodies a construction which capably withstands the damaging explosive forces directed upon the upper end of the cylinder.

As shown in Fig. 4, the cam shaft 33 is suitably connected by means of a tongue and slot arrangement to the shaft 57 of a suitable magneto 58. The magneto is secured to the end of the cam shaft housing 35 by means of a bracket 59.

Connected to the cylinder heads 18' are tubular members 60 which convey the discharged gases of combustion into the outer atmosphere. A suitable enclosure for the cam shaft housing 35 and other parts of the engine is shown at 61.

My improved engine is provided in the usual manner with suitable driving means connecting the crankshaft with the cam shafts.

Having described my invention, what I claim is:

1. In an internal combustion engine, a cylinder provided with intake and exhaust ports and having separate head and cylinder jackets, the former being positioned above and connected to the latter, partition means in the head dividing its interior into connected chambers, one of which is positioned above the exhaust port and another of which is positioned above the intake port, and an inlet jet positioned to discharge a liquid coolant into the chamber positioned above the exhaust port and directly upon that part of the head located in close proximity to the said exhaust port.

2. In an internal combustion engine, a cylinder provided with intake and exhaust ports and having separate head and cylinder jackets, the former being positioned above and connected to the latter, partition means in the head dividing its interior into connected chambers, one of which is positioned above the exhaust port and the other of which is positioned above the intake port, baffle means for retarding the downward flow of a liquid coolant from each of the said chambers of the head into the water jacket of the cylinder, and inlet means for delivering a liquid coolant to the chamber located above the exhaust port.

3. In an internal combustion engine, a cylinder provided with intake and exhaust ports and having separate head and cylinder jackets, the former being positioned above and connected to the latter, partition means in the head dividing its interior into connected chambers, one of which is positioned above the exhaust port and the other of which is positioned above the intake port, baffle means interposed between the chambers of the head and the cylinder jacket for retarding the downward flow of a liquid coolant from the said chambers to the cylinder jacket, an inlet jet arranged to discharge a liquid coolant into chamber of the head located above exhaust port, the said inlet jet having its discharge and positioned to direct the liquid coolant directly upon that part of the wall of the head located in closest proximity to the exhaust port, and outlet means connected to the cylinder jacket.

4. In an internal combustion engine, a crankcase assembly comprising a plurality of spaced tubular sections each having opposed cylinder openings in its side walls, and a plurality of bearing webs interposed between and secured to the tubular sections, the said webs having axial bearings for rotatably supporting a crankshaft.

5. In an internal combustion engine, a crankcase assembly comprising a plurality of spaced tubular sections each having cylinder openings in its side walls, a plurality of chambered bearing webs interposed between and secured to the tubular sections, each web having an annular passage for the circulation of a coolant around its axial bearing, the said webs having axial bearings for rotatably supporting a crankshaft, and means for delivering a liquid coolant to the chambers of the webs.

6. In an internal combustion engine, a crankcase assembly comprising a plurality of spaced tubular sections each having cylinder openings in its side walls, a plurality of bearing webs interposed between and secured to the tubular sections, each having an axial bearing for rotatably mounting a crankshaft, the said webs each having an annular chamber surrounding its bearing, inlet means in each bearing web for supplying a liquid coolant to the annular chamber, and outlet means in each web for conveying the liquid coolant from the said chamber.

7. In an internal combustion engine, a crankcase assembly comprising a plurality of spaced tubular sections each having cylinder openings in its side walls, a plurality of bearing webs interposed between and secured to the tubular sections, each having an axial bearing for rotatably mounting a crankshaft, the said webs each having an annular chamber surrounding its bearing, inlet means in each bearing web for supplying a liquid coolant to the annular chamber, outlet means in each web for conveying the liquid coolant from the said chamber, and means in each web for conveying a lubricant to its bearing.

8. In an internal combustion engine, a cylinder having a head provided with intake and exhaust ports, separate but connected water jackets extending around the cylinder and the head, partition means dividing the water jacket of the head into interconnected chambers, one of which is arranged above the exhaust port and another of which is arranged above the intake port, water inlet means for supplying water to the chamber located above the exhaust port, and baffle means for restricting the flow of water from the water jacket of the head to the water jacket of the cylinder.

9. In an internal combustion engine, a cylinder having a head provided with intake and exhaust ports, separate but connected water jackets extending around the cylinder and the head, partition means dividing the water jacket of the head into interconnected chambers, one of which is arranged above the exhaust port and another of which is arranged above the intake port, outlet means in the upper side of the partition for allowing a liquid coolant to flow from one chamber to another, inlet means for supplying a liquid coolant to the chamber located above the exhaust port, and discharge means connecting the chamber located above the exhaust port with the water jacket of the cylinder, the said discharge means having less capacity than the inlet means.

10. In an internal combustion engine, a cylindrical crank case having opposed cylinder openings in its sides, a plurality of spaced bearing webs formed in the case, each having an axial bearing for rotatably mounting a crank shaft, the said webs each having circulating means for supplying a liquid coolant to the area contiguous to its associated bearing.

11. In an internal combustion engine, a cylindrical crank case, a plurality of spaced bearing webs formed in the case, each having an axial bearing for rotatably mounting a crank shaft, the said webs each having an annular chamber surrounding its bearing, inlet means in each bearing for supplying a liquid coolant to its annular chamber, and outlet means for conveying the coolant from said chamber.

12. In an internal combustion engine, a cylinder block having a plurality of aligned cylinders, each having exhaust and intake ports, a water jacket extending around the cylinders, a water jacket extending over the heads of each cylinder, a longitudinally disposed baffle extending substantially the length of the cylinder block and arranged to divide the interior of each of the water jackets of the cylinder heads into two spaced but connected chambers, the said baffle being positioned in substantial alignment with the axes of the cylinders, and a jet extending into one of the chambers of each cylinder water jacket for directing a liquid coolant therein.

EARL J. EDMUNDS.